United States Patent [19]
Schetter

[11] Patent Number: 6,058,899
[45] Date of Patent: May 9, 2000

[54] SEPARATOR

[75] Inventor: Martin Schetter, Besigheim, Germany

[73] Assignee: Filterwerk Mann & Hummel GmbH, Ludwigsburg, Germany

[21] Appl. No.: 09/125,507
[22] PCT Filed: Feb. 6, 1997
[86] PCT No.: PCT/EP97/00537
 § 371 Date: Nov. 24, 1998
 § 102(e) Date: Nov. 24, 1998
[87] PCT Pub. No.: WO97/31180
 PCT Pub. Date: Aug. 28, 1997

[30] Foreign Application Priority Data

Feb. 20, 1996 [DE] Germany ............ 196 06 182

[51] Int. Cl.$^7$ ............... F01M 11/03; B04B 5/12
[52] U.S. Cl. ............ 123/196 A; 184/6.24; 210/168; 210/297; 210/377; 210/405; 210/429; 210/512.1
[58] Field of Search ............ 123/196 A, 196 R; 184/6.24; 210/168, 294, 297, 377, 405, 429, 512.1

[56] References Cited

U.S. PATENT DOCUMENTS 4,615,315 10/1986 Graham .................. 123/196 A

FOREIGN PATENT DOCUMENTS 0 171 138  2/1986  European Pat. Off. .
03 068 407A  3/1991  Japan .

Primary Examiner—Erick R. Solis
Assistant Examiner—Brian Hairston
Attorney, Agent, or Firm—Evenson, McKeown, Edwards & Lenahan, P.L.L.C.

[57] ABSTRACT

A device for separating impurities from the lubricating oil of an internal combustion engine, in which the device (1) has at least one filter insert (2), a centrifuge (3) operable by the flow of lubricating oil, and at least one discharge channel (5) for cleaned oil, in which the filter insert (2) and the centrifuge operable by the flow of oil are in separate housings linked by at least one communicating oil channel (6).

8 Claims, 6 Drawing Sheets

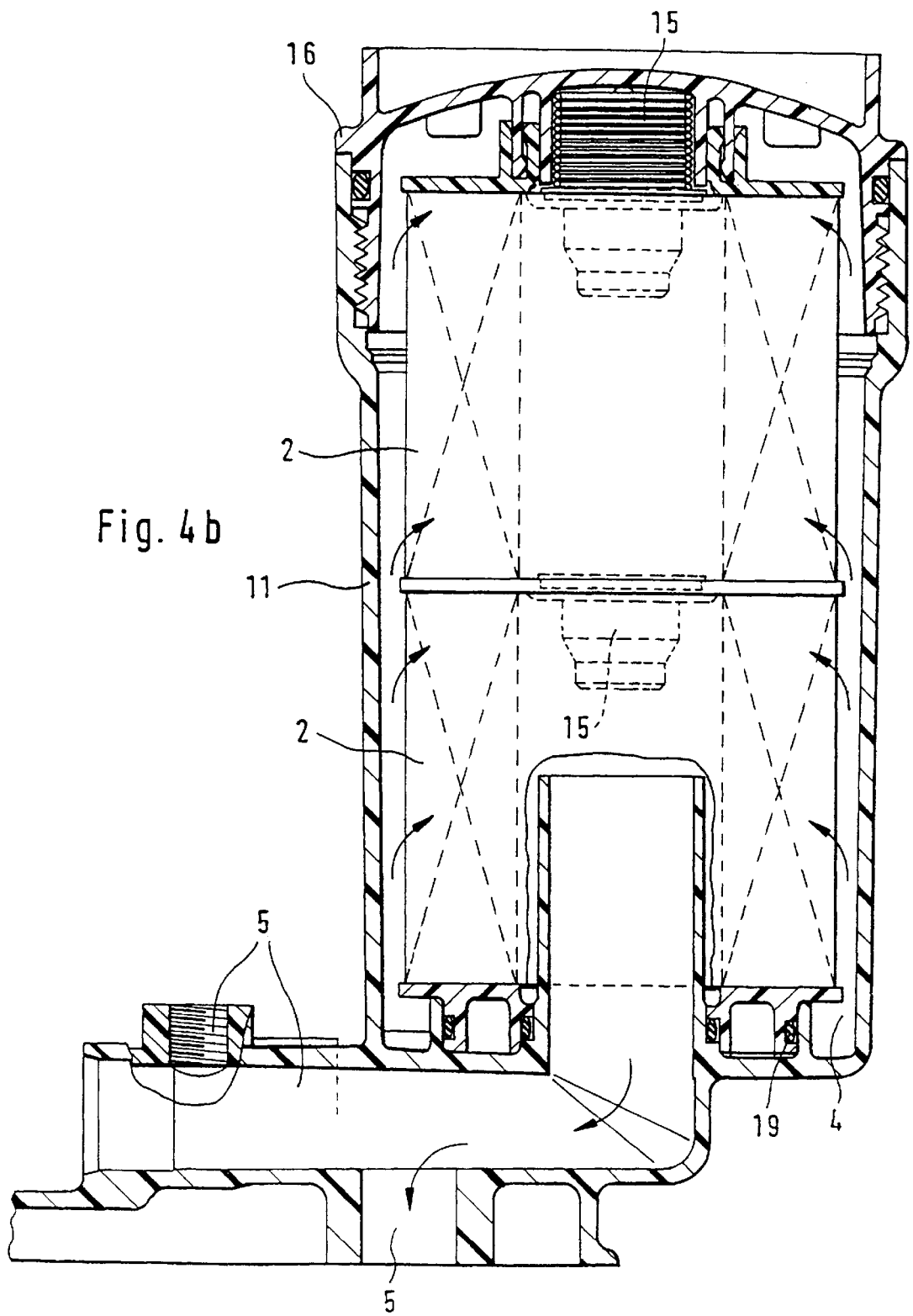

SEPARATOR

BACKGROUND OF THE INVENTION

The invention relates to an apparatus for separating impurities from the lubricant oil of an internal combustion engine.

Such apparatus are known, for example in German Patent 43 06 431. If it is desired to use such apparatus, for example in crowded engine compartments of internal combustion engines, it is a disadvantage that often the necessary space is not available for it. It might be possible to mount such an apparatus outside of the engine compartment. This, however, is complicated, inasmuch as it would involve the additional expense of conduits and the necessary pumps; therefore it would increase the cost of the apparatus. But also the maintenance and the replacement of parts would make it impractical.

SUMMARY OF THE INVENTION

The invention is therefore addressed to the problem of improving an apparatus of the kind described above so as to have an apparatus which is easy to set up, flexible in application and design, as well as inexpensive.

This problem is solved by the invention by providing an apparatus comprising at least one filter insert, a centrifuge that can be driven by flowing lubricant oil, and at least one inlet passage for lubricant oil to be cleaned and at least one outlet passage for cleaned lubricant oil, wherein the filter insert and the centrifuge driven by flowing lubricant oil are located in separate housings connected by a communicating lubricant oil passage.

Thus it becomes possible to arrange the two functional units, filter insert and centrifuge, at nearly any desired place in the engine compartment of an internal combustion engine. Suitably, an effort should be made to keep the lengths of the flow passages short so as to keep the pressure losses low.

Advantageously, provision can be made for a pressure regulating valve to be contained in at least one of the communicating lubricant oil passages. This will assure for example that optimum working conditions will prevail in the centrifuge.

In an additional advantageous embodiment provision can be made for the centrifuge and/or the filter insert to be situated in the area of an operating element of the internal combustion engine. This assures that so-called functional units can be formed, capable of acting in concert on elements involved in control, regulation and power. This applies in the same degree to housing walls that can be used in common.

Another advantageous embodiment provides that the functional element is the crankcase venting valve, which is suitable because of its geometrical configuration.

Advantageously it is possible to provide for the centrifuge and/or filter insert and the functional element to have at least one common housing side. By the formation of functional units that use, for example, common housing sides, a weight-saving effect can be achieved. The spatial requirements can thus also be reduced.

Another advantageous embodiment provides for the longitudinal axes of filter and centrifuge to be arranged parallel to one another.

In another advantageous embodiment of the invention, the filter is removable and replaceable with the filter housing open. This facilitates maintenance and filter element replacement.

In another advantageous embodiment, the passage feeding the apparatus is the same as the passage feeding the centrifuge. In this variant the centrifuge is operated on the raw oil side.

In another advantageous embodiment of the invention, the outlet passage of the apparatus is the same as the passage feeding the centrifuge. In this case the centrifuge is operated on the clean oil side.

These and other features of preferred embodiments of the invention will be found not only in the claims but also in the description and the drawings, it being possible for the individual features to be realized individually or together in the form of sub-combinations in the embodiment of the invention and in other fields, and can be advantageous as well as independently patentable embodiments for which protection is hereby claimed.

BRIEF DESCRIPTION OF THE DRAWINGS

Embodiments of the invention are depicted in the drawings and are further explained below. The drawings show.

DETAILED DESCRIPTION OF PREFERRED EMBODIMENTS

Figure 1:
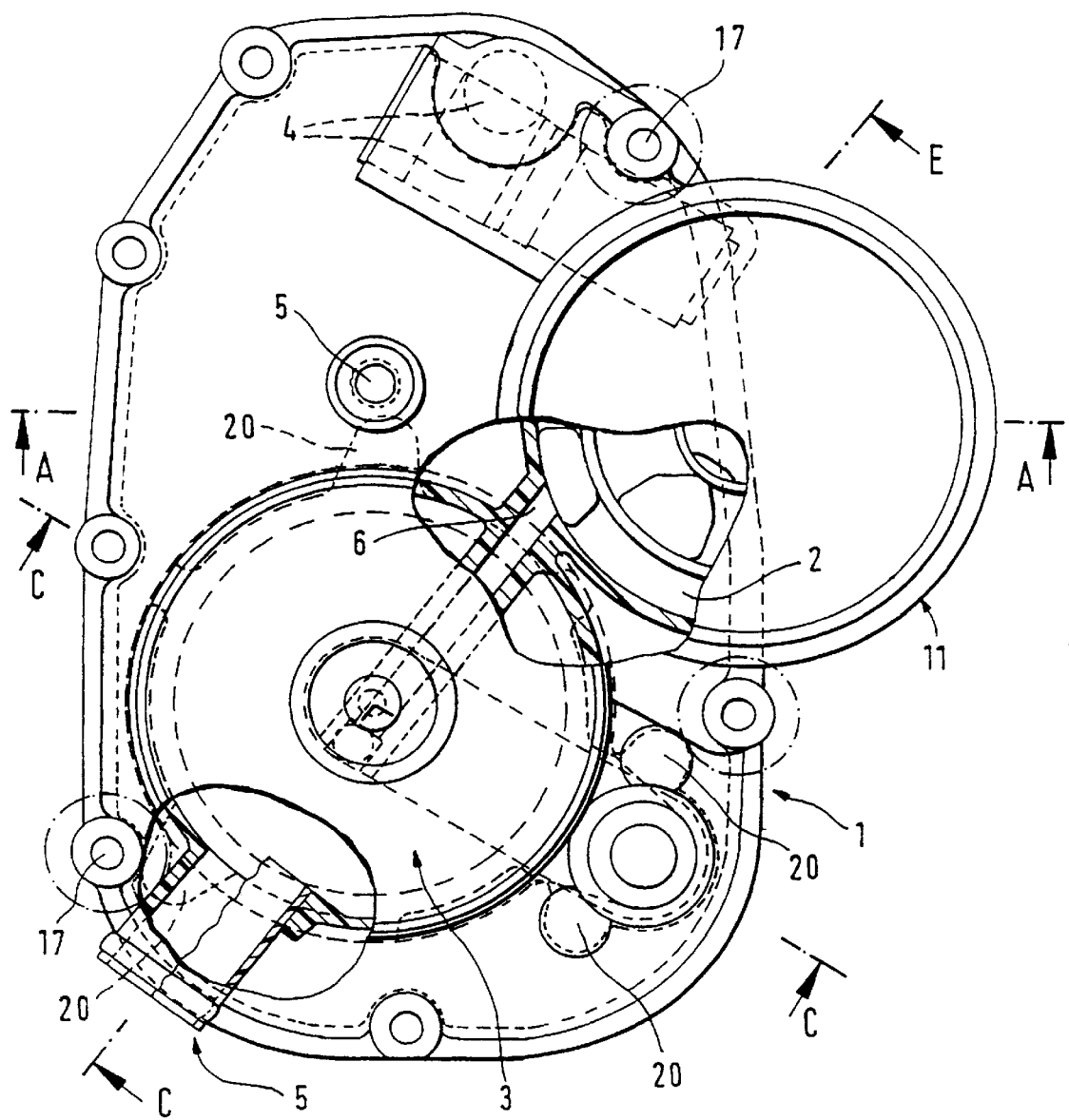
FIG. 1 a top view of the apparatus.
Figure 2:
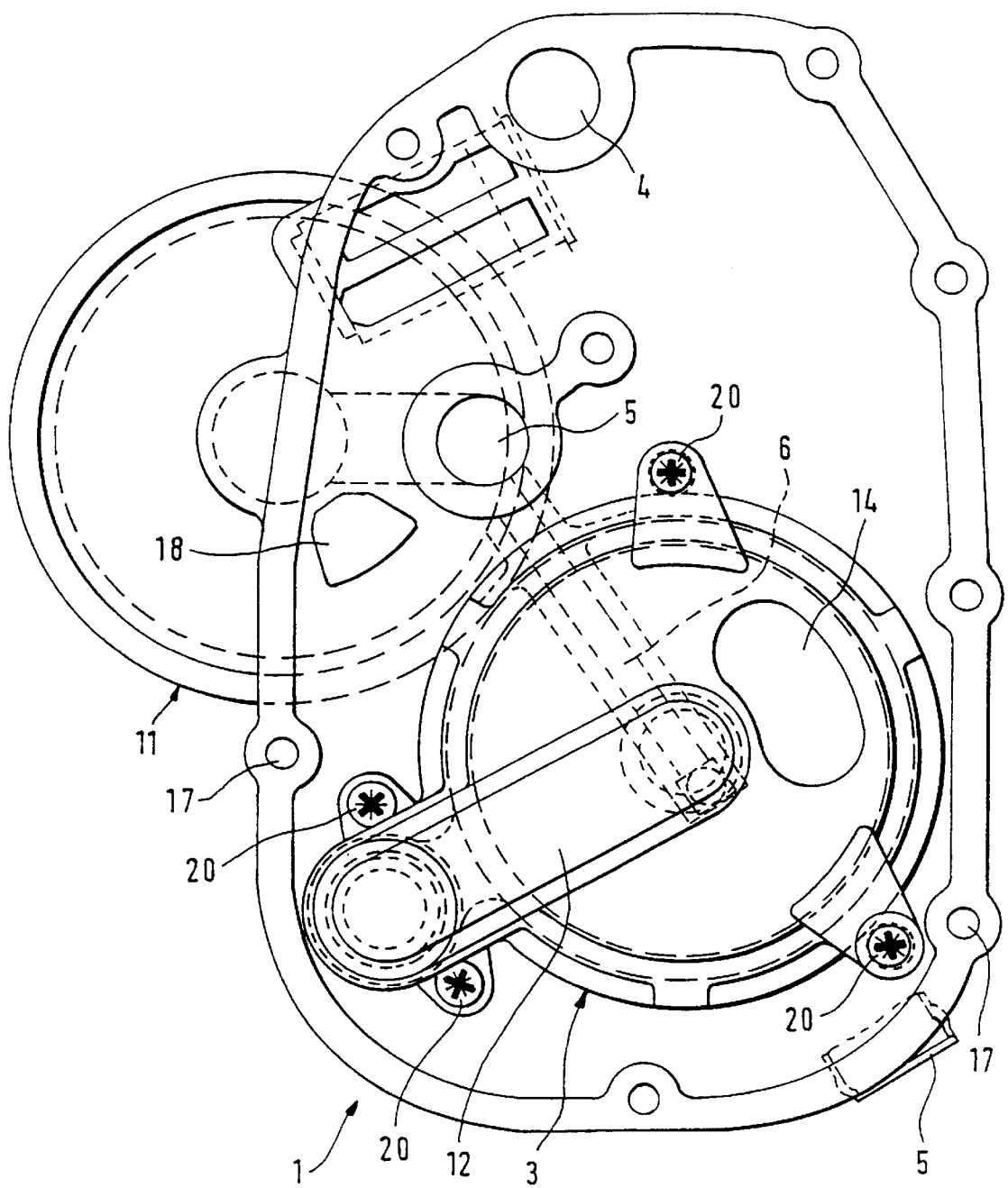
FIG. 2 a view from below.
Figure 3:
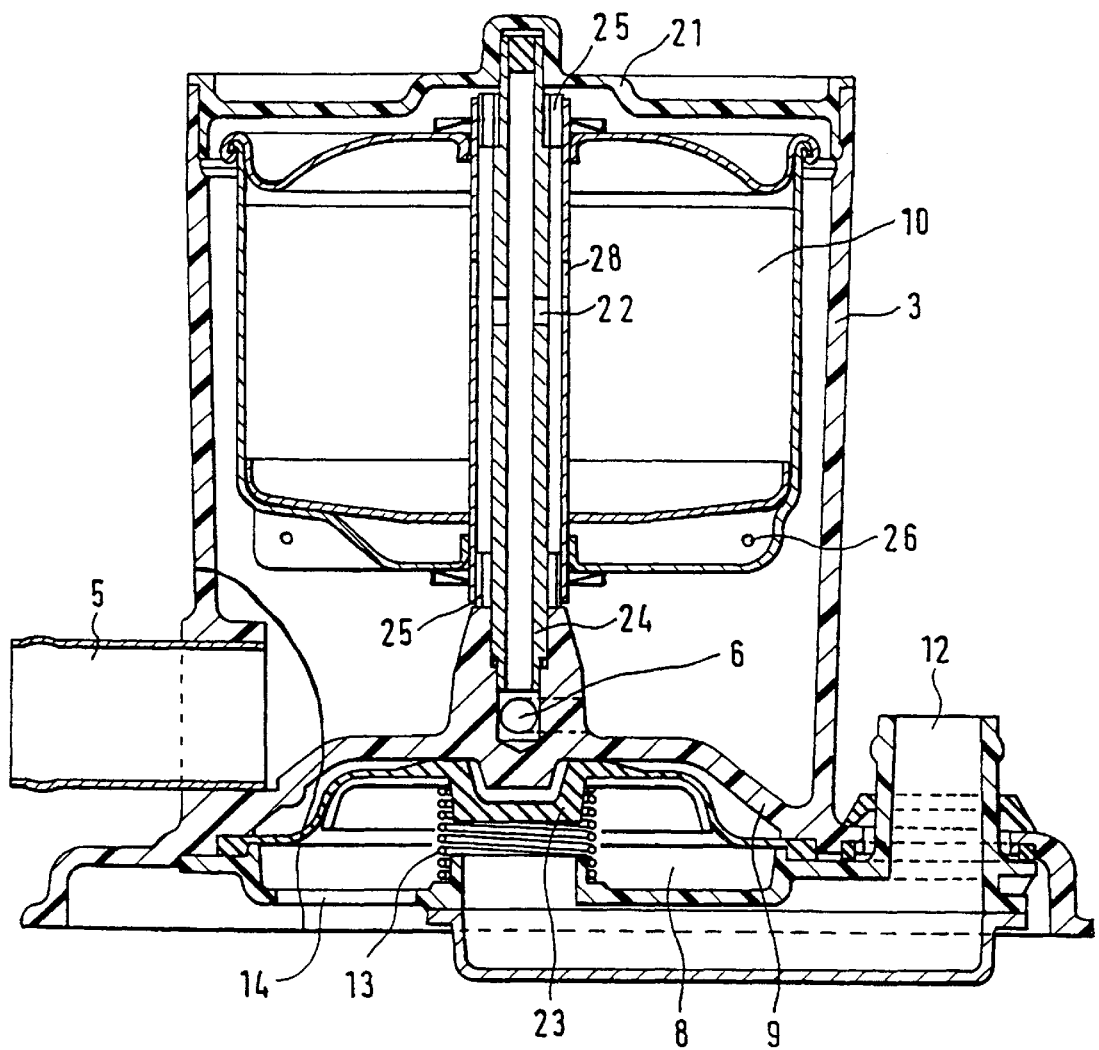
FIG. 3 a section along line C—C.
Figure 4A:
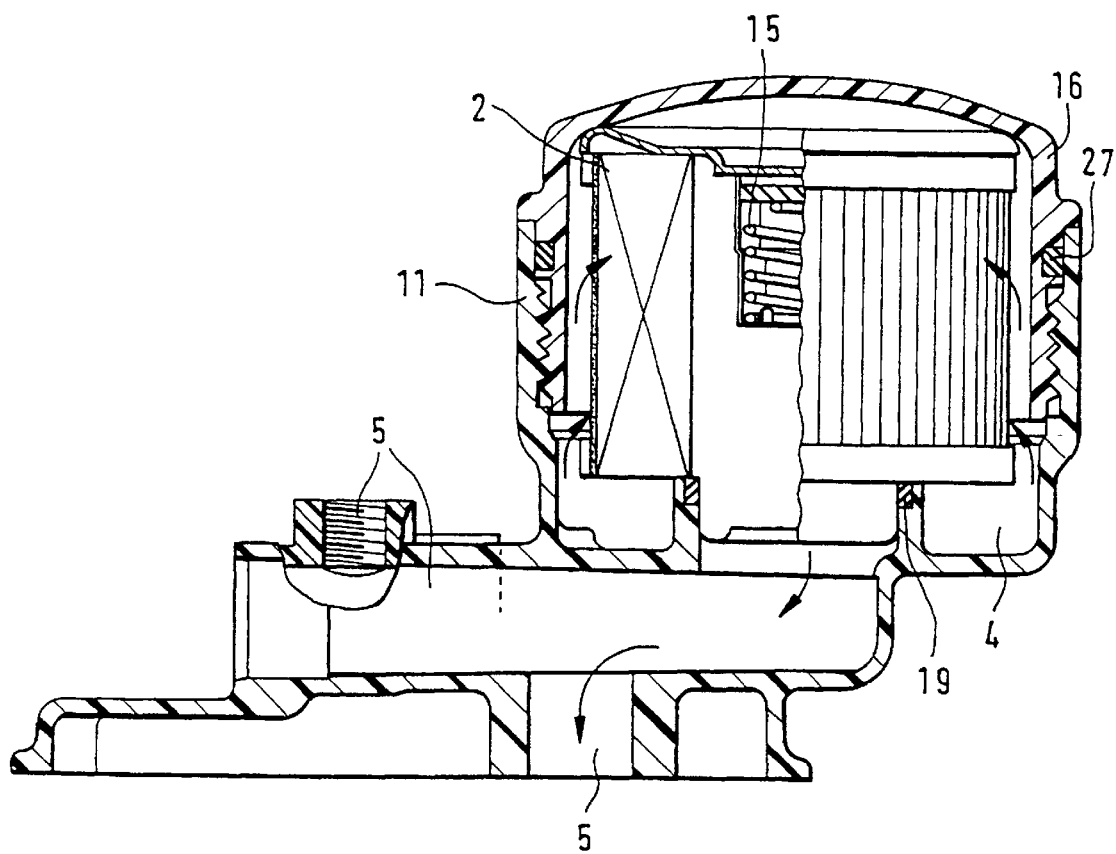
FIGS. 4a, b a section along line A—A.

The apparatus 1, which is shown in FIGS. 1 and 2, comprises a filter insert 2, which is to be seen in FIGS. 1, 4a and 4b, and a centrifuge rotor 10 illustrated in FIG. 3, which, as shown in FIG. 1, are connected together by a communicating lubricant oil passage 6. The apparatus 1 is fastened to the internal combustion engine by means of housing mounting bores 17 and screws not shown. Both the filter insert 2 and the centrifuge rotor 10 are situated in separate housings. The housing 11 of filter insert 2, which is shown in FIGS. 1, 2, 4a and 4b, has an inlet passage 4 shown in FIGS. 1, 2 and 4b, through which raw oil enters in the case where the centrifuge is fed on the clean oil side, and the raw oil, after passing the filter insert 2, flows through the communicating lubricant oil passage represented in FIGS. 1, 2, 3, 5 6a and 6b, into the centrifuge rotor 10 through the inlet 22 integrated into the centrifuge shaft 24 and arrives at the inlet opening 28 provided in the centrifuge rotor 10 and shown in FIG. 3. It is also shown in FIG. 3 how the oil entering the centrifuge rotor 0 is carried through a hollow centrifuge shaft 24, whereby the centrifuge shaft 24 is anchored in the centrifuge housing 3 and centrifuge housing cover 21 such that, in connection with the sealing centrifuge bearing 25 the oil can pass only through the centrifuge rotor nozzle 26 into the space surrounding the centrifuge rotor in the centrifuge housing 3. From there the filtered and centrifuged oil leaves the apparatus 1 through the outlet passage 5 situated on the housing 3 and represented in FIGS. 1, 2, 3, 4a, 4b, 6a and 6b, doing so without pressure.

Figure 5:
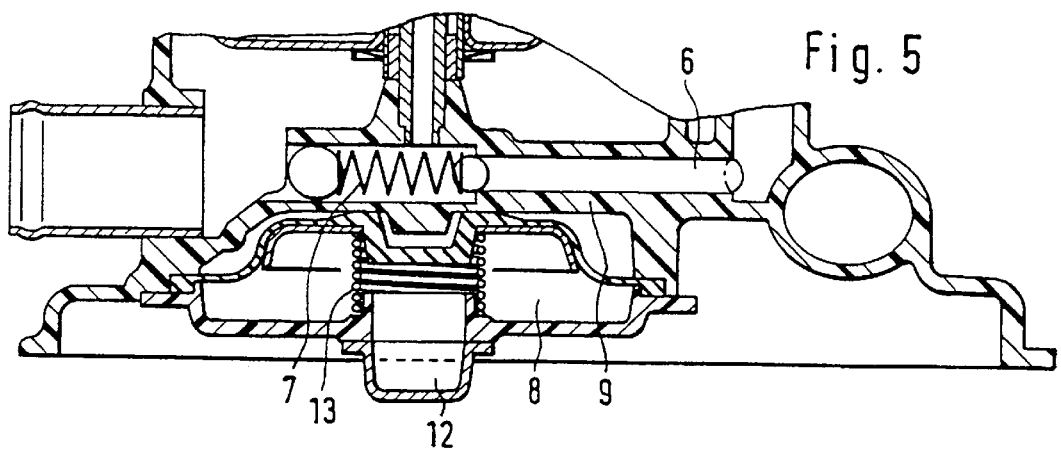
FIG. 5 a section along line C–E.
Figure 6A:
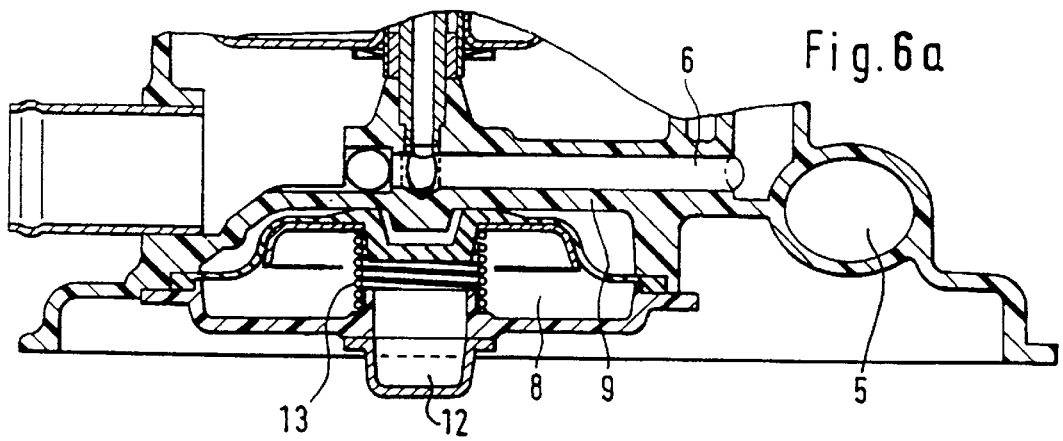
FIGS. 6a, b a section along line C–E.
Figure 6B:
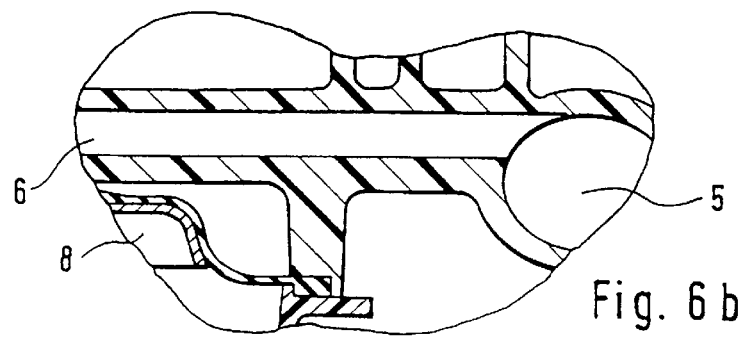

The centrifuge housing 3 is arranged on the internal combustion engine in such a manner, as represented in FIG. 3, that the crankcase venting valve 8, which has a coil spring 13 communicating with a valve plate 23 and shown also in FIGS. 5 and 6a, and is vented through the vent passage 12 shown in FIGS. 2, 3, 5 and 6a, and the centrifuge housing 3 have a common housing wall 9, which is additionally visible in FIGS. 5 and 6a. The crankcase housing vent valve 8, which is additionally shown in FIGS. 5, 6a and 6b, has contact, through connecting opening 14 which appears in FIG. 3, with the crankcase, not shown, of the internal combustion engine. The centrifuge housing 3 is fastened to the apparatus 1 by means of the centrifuge housing fasteners 20 shown in FIG. 1 and FIG. 2. Both the housing 11 of filter insert 2, and that of centrifuge 3 can be opened (FIGS. 3 and 4) such that, after both the filter housing cover 16 represented in FIGS. 4a and 4b and the centrifuge housing cover 21 are removed, the filter insert 2 or centrifuge rotor 10 can be removed from their open housings and replaced. The housing covers 16 and 21 are fastened to the housings by means of screws or snap fasteners, such that in the operating state no oil can leave the housing interiors, as is represented for example by gasket 27 in FIG. 4a.

In the lubricant oil passage 6 communicating with the housings of the filter insert 2 and the centrifuge 3 there is a pressure regulating valve 7 which is shown in FIG. 5 and is in the form of a ball-and-spring valve.

In an alternative embodiment, the apparatus 1, as represented in FIG. 4b, has two filter inserts 2 which are accommodated in a single housing such that they can be exchanged after the housing is opened. The filter inserts 2 are sealed in the installed state by means of the filter gasket 19 represented in FIGS. 4a and 4b from the filter chamber drain opening 18 which is shown in FIG. 2. When the filter inserts 2 are exchanged, the oil present in the filter chamber can flow back by gravity into the crankcase. The filter inserts 2 have, as shown in FIGS. 4a and 4b, filter by-pass valves 15 which prevent interruption of the oil pressure when the filter is clogged.

In another alternative embodiment, the centrifuge is fed on the raw oil side, as represented in FIG. 6a. The feeding of the centrifuge fed on the clean oil side is shown for comparison in FIG. 6b. In the embodiments described above the centrifuge is operated in a by-pass stream, the oil leaves the centrifuge by gravity, and the centrifuged oil flows for example into the oil pan, which is not shown.

What is claimed is:

1. An apparatus for separating impurities from lubricating oil of an internal combustion engine, said apparatus comprising at least one filter insert situated in a first housing, a centrifuge driven by flowing lubricating oil of said engine, said centrifuge being situated in a second housing, at least one feed passage for supplying lubricating oil to be cleaned to the apparatus, and at least one outlet passage for cleaned lubricant oil, and at least one lubricant oil passage communicating between said first and second housings, said first and second housings being arranged side by side and having central axes which are parallel to each other and a common housing wall section shared by both housings, and a pressure regulating valve disposed in the at least one lubricant oil passage communicating between said first and second housings.

2. An apparatus according to claim 1, wherein at least one of the centrifuge and the filter insert is arranged in the area of a functional element of the internal combustion engine.

3. An apparatus according to claim 2, wherein said functional element has a common housing area with at least one of said first and second housings.

4. An apparatus according to claim 1, wherein said first housing has a removable cover for opening the housing to enable removal and replacement of said filter insert.

5. An apparatus according to claim 1, wherein said second housing has a removable cover for opening the housing to enable removal and replacement of a rotor of said centrifuge.

6. An apparatus according to claim 1, wherein said feed passage leads to said centrifuge for supplying lubricating oil to the the centrifuge to be cleaned by centrifugation.

7. An apparatus according to claim 1, wherein said feed passage leads to said filter for supplying lubricating oil to the filter insert to be cleaned by filtration.

8. An apparatus for separating impurities from lubricating oil of an internal combustion engine, said apparatus comprising at least one filter insert situated in a first housing, a centrifuge driven by flowing lubricating oil of said engine, said centrifuge being situated in a second housing, at least one feed passage for supplying lubricating oil to be cleaned to the apparatus, and at least one outlet passage for cleaned lubricant oil, and at least one lubricant oil passage communicating between said first and second housings, said first and second housings being arranged side by side and having central axes which are parallel to each other and a common housing wall section shared by both housings, at least one of the centrifuge and the filter insert being arranged in the area of a crankcase venting valve for the internal combustion engine.

* * * * *